J. ZLUTICKY.
SAW GUARD.
APPLICATION FILED JUNE 26, 1920.

1,402,915.

Patented Jan. 10, 1922.

Witness:
R. Burkhardt

Inventor:
Joseph Zluticky
By Walter M. Fuller
Atty.

UNITED STATES PATENT OFFICE.

JOSEPH ZLUTICKY, OF BELOIT, WISCONSIN, ASSIGNOR TO P. B. YATES MACHINE COMPANY, OF BELOIT, WISCONSIN, A CORPORATION OF WISCONSIN.

SAW GUARD.

1,402,915.  Specification of Letters Patent.  Patented Jan. 10, 1922.

Application filed June 26, 1920. Serial No. 391,953.

*To all whom it may concern:*

Be it known that I, JOSEPH ZLUTICKY, a citizen of the United States, residing at Beloit, in the county of Rock and State of Wisconsin, have invented certain new and useful Improvements in Saw Guards, of which the following is a specification.

My invention relates to improvements and features of novelty and advantage in safety or guard means associated with a revolving saw to prevent narrow edgings, slivers, and thin pieces of stock removed from boards by the saw, located above a lonigtudinally-grooved traveling-bed or endless feed-chain associated with the usual table and complementary pressure-rollers, from contacting with the saw in such a way that they would be likely to be forced or driven in the direction of the operator. It is dangerous to permit such an occurrence to take place, since the rapidly-revolving saw-teeth may shoot out or kick back the strips with considerable speed and force to the possible injury of the attendant of the machine. It is desirable, therefore, to block, fill, or guard the lengthwise groove of the moving bed or chain, preferably in such manner that the device can be used with rip saws for example of various dimensions without requiring change, modification, or adjustment, and in addition it is important to provide means directly to the rear of the saw and projecting above the traveling-bed to prevent such edgings, slivers, or pieces of stock from crossing the plane of the saw and becoming engaged with its rapidly revolving teeth, otherwise such pieces may be projected from the machine with considerable violence.

A further purpose and desirable object of the invention is the provision of an attachment or appliance of this character which shall be simple in structure, economical to produce, and unlikely to become damaged or injured in service, which may be readily applied to or removed from the machine, and which will in no way interfere with or detrimentally affect the operation of the saw with which it is associated.

In the preferred embodiment of the invention, a supplemental element for blade-like guard is employed in the plane of and to the rear of the saw upstanding from a straight guard-bar of the type set forth in Patent 1,271,473, Johnson, saw guards, granted July 2, 1918, occupying the lengthwise groove of the endless traveling-bed and supported at its ends only on the main table in any desired and simple manner, such bar to accommodate the portion of the saw which projects down into the groove of the feed-chain or traveling-bed being recessed or grooved, but preferably only at that place where the saw is located. Such bar or strip, therefore, constitutes not only a support for the guard blade or fin specified but also forms a stationary filler piece or strip in the groove of the traveling-bed or endless chain preventing the small pieces of stock from falling into such groove, where they might possibly come into contact with the rapidly-revolving saw-teeth and be projected from the machine with more or less violence and possible injury to anyone nearby, the upstanding blade supplementing the action of the bar in preventing such pieces of stock from coming into engagement with the teeth above the bed.

In order that those skilled in this art may have a full and complete understanding of the invention and its various features of novelty and benefit both from structural and functional standpoints, I have illustrated a desirable embodiment of the same in the accompanying drawing in the two views of which like reference characters refer to the same parts.

In this drawing—

Figure 1:
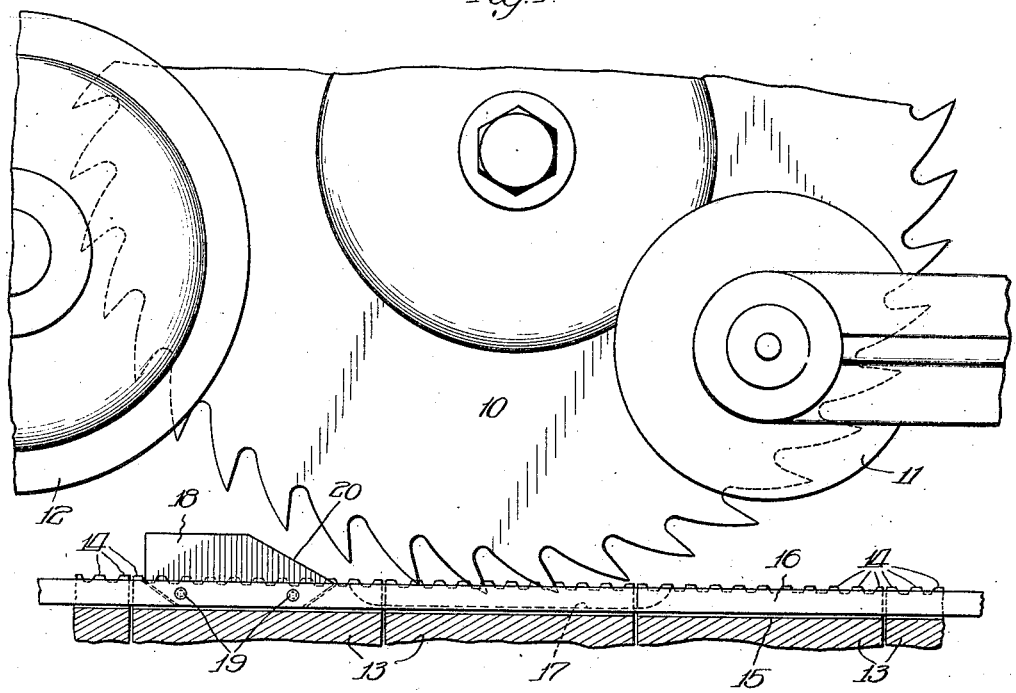
Figure 1 is a fragmentary vertical section adjacent to the saw showing the improved appliance applied to a saw structure of ordinary construction.

By reference to the drawing, it will be seen that the saw appliance includes the usual, circular, rotary rip saw 10 and its accompanying and associated front and rear pressure-rollers 11 and 12, portions only of which are shown, and, as is customary, the device includes a table (not shown) longitudinally cut away beneath the saw and the rollers for the accommodation of the usual endless, traveling, feed bed or chain 13, each hinged element or link member of which has a roughened upper face 14 centrally, longitudinally grooved at 15 for the reception of the lower teeth of the saw, thus permitting the latter to cut entirely through the board riding on the bed by which it is fed forwardly and against which it is pressed for such feeding action by the pressure-rollers. Located in this lengthwise groove, composed of a series of relatively-short, aligned channels in the plurality of feeding bed elements 13, is the stationary, filler bar or guard 16, desirably rectangular in cross-section, and supported only at its two ends in any approved manner on the table as by screws in the way shown in the Johnson patent mentioned above. Such bar or filler strip, which is illustrated broken away in both figures of the drawing, is of slightly less dimensions in cross-section that the corresponding measurements of the groove in which it is received, so that, whereas such bar is maintained stationary, the traveling-bed or feed-chain elements may move along out of contact therewith, thus avoiding friction. As is shown in both figures of the drawing, this bar, filler-piece, or guard-strip is recessed or milled out at 17 just beneath the saw 10 for the accommodation of the extreme lower portion of the latter, and, if desired, this groove or cavity may be of varying depth so that its bottom may conform in a general way to the lower curvature of the saw-teeth.

It will be appreciated, therefore, that owing to the fact that the channel or furrow in the traveling bed is occupied, filled, or guarded by this bar, narrow pieces of board or edgings cut off by the saw are prevented from falling into the groove and coming into contact with the rapidly-rotating saw-teeth and, hence, such pieces are prevented from being forcibly projected along the bed and from the machine, possibly to the injury of anyone standing in the path of their travel.

Stated somewhat differently, such narrow or thin pieces of stock are carried along by the bed and discharged from the machine without retrograde movement by the action of the saw itself thereon. If the part of the board removed by the saw is of sufficient thickness to engage both the bed and the pressure-rollers, there is no danger of its falling into the groove of the bed with the injurious results indicated, but the improved means herein set forth constitute a sort of safety appliance or guard to prevent thin or narrow pieces, which do not engage both the bed and the rollers, from being shot back and projected from the machine in the manner specified.

Figure 2:
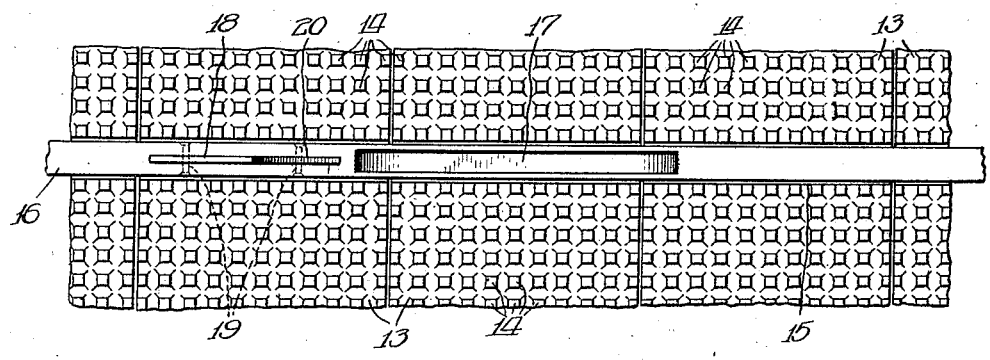
Figure 2 is a fragmentary plan view of a portion of the traveling-bed or endless-chain provided with the groove which accommodates the bar recessed to receive the lower teeth of the saw and supplied with the upstanding fin or blade acting as a supplementary or auxiliary guard.

The means described constitute only part of the protective appliance and supplementing this is a thin upstanding blade or fin 18 riveted at 19 in a vertical slot in the bar 16 and projecting a substantial distance above the top faces of the traveling-bed and stationary-bar, being located, as is clearly shown in Figure 2, in the plane of the saw and beveled or cut away at 20 to conform more or less to the curved periphery of the saw. This upstanding plate or blade prevents any pieces of stock from crossing the plane of the saw while resting on the bed thus eliminating the possibility of any of such pieces being engaged by the teeth of the gear portion of the saw and forced violently forwardly because of the rapidly revolving action of such saw teeth.

Thus the bar 16 prevents pieces of stock from falling into the groove and being acted on by the saw teeth and the supplemental or complementary element 18 prevents pieces on the bed from improperly being acted upon by the saw to the possible damage or injury of the operator.

This invention is not necessarily limited and restricted to the precise and exact details of structure presented since these may be modified within wide limits without departure from the substance of the invention and without sacrificing any of its substantial benefits and advantages.

I claim:

1. In a saw-appliance of the character described, the combination of a longitudinally-grooved endless traveling-bed, a saw above and adapted to project into the groove of said bed, a stationary filler-piece in said groove adapted to prevent narrow pieces of stock from entering the groove and coming into contact with the saw teeth, and a guard on said filler-piece in the plane of and to the rear of the saw and projecting above the surface of said bed, substantially as described.

2. In a saw-appliance of the character described, the combination of a longitudinally-grooved endless traveling-bed, a saw above and adapted to project into the groove of said bed, a stationary filler-bar, supported at its two ends only, recessed for the accommodation of the saw teeth, located in said groove entirely below the active surface of the bed and adapted to prevent narrow pieces of stock from entering the bed groove and coming into contact with the saw teeth, and an upstanding guard on said bar in the plane of and to the rear of the saw and projecting above the upper face of said bed, substantially as described.

JOSEPH ZLUTICKY.